United States Patent
Horikoshi

(10) Patent No.: US 8,154,852 B2
(45) Date of Patent: Apr. 10, 2012

(54) ELECTRIC DOUBLE LAYER CAPACITOR

(75) Inventor: Ron Horikoshi, Shizuoka (JP)

(73) Assignee: Meidensha Corporation, Tokyo (JP)

( * ) Notice: Subject to any disclaimer, the term of this patent is extended or adjusted under 35 U.S.C. 154(b) by 443 days.

(21) Appl. No.: 12/523,942

(22) PCT Filed: Jan. 24, 2008

(86) PCT No.: PCT/JP2008/050987
§ 371 (c)(1),
(2), (4) Date: Jul. 21, 2009

(87) PCT Pub. No.: WO2008/093593
PCT Pub. Date: Aug. 7, 2008

(65) Prior Publication Data
US 2010/0053846 A1 Mar. 4, 2010

(30) Foreign Application Priority Data
Feb. 2, 2007 (JP) .................. 2007-023922

(51) Int. Cl.
*H01G 9/00* (2006.01)
(52) U.S. Cl. ...................................... 361/502
(58) Field of Classification Search .................. 361/502
See application file for complete search history.

(56) References Cited

U.S. PATENT DOCUMENTS

| | | | | |
|---|---|---|---|---|
| 2003/0035262 A1* | 2/2003 | Ikeda et al. | ............. | 361/502 |
| 2007/0002523 A1* | 1/2007 | Ando et al. | ............. | 361/503 |
| 2007/0002524 A1* | 1/2007 | Ando et al. | ............. | 361/503 |
| 2008/0105557 A1* | 5/2008 | Cohen et al. | ............. | 205/157 |
| 2009/0097189 A1* | 4/2009 | Tasaki et al. | ............. | 361/512 |

FOREIGN PATENT DOCUMENTS

| | | | |
|---|---|---|---|
| JP | 06188149 A | * | 7/1994 |
| JP | 2002-313677 A | | 10/2002 |
| JP | 2004-128311 A | | 4/2004 |
| JP | 2004-228345 A | | 8/2004 |
| JP | 2005-044821 A | | 2/2005 |
| JP | 2006286919 A | * | 10/2006 |

* cited by examiner

*Primary Examiner* — Eric Thomas

(74) *Attorney, Agent, or Firm* — Foley & Lardner LLP

(57) ABSTRACT

It is disclosed that an electric double layer capacitor includes a plurality of cells each including activated-carbon electrodes disposed on both sides of a separator; a plurality of packing members each disposed at an outer periphery of the cell, each of the plurality of cells and the plurality of packing members being stacked through a charge collector; and both end plates sandwiching the plurality of cells and the plurality of packing members through both collector electrodes, at least one of the end plates being formed with an inlet through which an electrolytic solution is injected. Moreover, the electric double layer capacitor is covered and sealed with an enclosing member. Moreover, the electric double layer capacitor includes an O-ring disposed in the inlet, or alternatively, an edge of the inlet is curved.

3 Claims, 5 Drawing Sheets

ELECTRIC DOUBLE LAYER CAPACITOR

TECHNICAL FIELD

The present invention relates to an electric double layer capacitor.

BACKGROUND ART

An electric double layer capacitor operates on the principle that an electricity is stored by allowing a physisorption of anion and cation included in an electrolyte, on positive-pole and negative-pole surfaces of polarizable electrodes.

For example, a bipolar-type electric double layer capacitor (hereinafter referred to as capacitor) 100 includes a plurality of cells 104 each of which includes an ion-permeable separator 101 and activated-carbon electrodes 102 and 103 disposed respectively at both sides of the separator 101, as shown in FIG. 4. The capacitor 100 is formed by providing a charge collector 105 between the adjacent cells 104 and by layering or stacking the plurality of cells 104. The activated-carbon electrodes 102 and 103 are impregnated with an electrolytic solution. A packing member 106 is disposed at an outer peripheral portion of the cell 104 so as not to leak this electrolytic solution. Moreover, this packing member 106 has a function to provide electrical isolation between the stacked cells 104.

A module includes cells 104 having the number corresponding to a necessary withstand voltage (withstand voltage of single cell is about equal to 2.5 V), packing members 106, and charge collectors 105, each of which are stacked. The capacitor 100 is constructed by fastening both surfaces of the module respectively to end plates 109 and 111 through collector electrodes 107 and 108. Accordingly, the capacitor 100 maintains its enclosed structure.

In the above-mentioned capacitor 100, the activated-carbon electrodes 102 and 103, the separators 101, and the collector electrodes 107 and 108 are connected with lead wires (not shown) which are connected in series inside the module so as to allow the capacitor 100 to have a withstand voltage corresponding to (single-cell withstand voltage)×(the number of stacked layers). Such a stacked capacitor unit has an advantage that cables and the like are unnecessary as compared with a general winding-type capacitor having the same capacitance, and therefore can be designed compactly to have a high withstand voltage. Accordingly, an installation area thereof can be reduced.

The above-mentioned capacitor 100 is produced by alternately stacking the activated-carbon electrodes 102 and 103, the separator 101, the charge collector 105, the packing member 106 and the like; by sealing the portions between respective cells 104; and then by putting the electrolytic solution into the inside of the capacitor so that the activated-carbon electrodes 102 and 103 and the separator 101 are impregnated with the electrolytic solution. Specifically, the electrolytic solution is introduced into an electrolytic-solution inlet 110 provided in one spot of the end plate 109, and then is made to diffuse into all the cells 104 through a hole 107a formed in the collector electrode 107 and a hole 105a formed in the charge collector 105.

As the above-mentioned electrolytic solution, an organic-solvent-base electrolytic solution and the like can be cited. In a capacitor using this organic-solvent-base electrolytic solution, it is necessary that a moisture is prevented from mixing with the electrolytic solution existing in the capacitor in order to suppress a characteristic degradation and a gas generation, by preventing an entry of the moisture. Therefore, as shown in FIG. 4, a film 114 which is a lamination of a metal aluminum foil, a polypropylene, a polyethylene or the like (hereinafter, referred to as an aluminum laminate film) encloses the whole of capacitor 100 to seal the capacitor 100 by welding an entrance portion of the film 114. However, the entry of moisture occurs at a slight pinhole or at a portion of welding failure having a size greater than a gas molecule level. Hence, the above-mentioned characteristic degradation becomes obvious with a long-term use. Accordingly, it is necessary to achieve a moisture blocking more certainly in order to maintain the characteristic of capacitor for a long time.

For the purpose of detecting the presence or absence of the pinhole and/or the welding failure in the aluminum laminate film 114 provided for the moisture blocking, for example, there is a method in which an inside of the film and the inside of the capacitor are depressurized to vacuum state and then are sealed. By bringing the inside of the film to the vacuum state by means of such a method, an external pressure sticks the film to the capacitor. In the case where the pinhole exists in the film, the vacuum state of the inside cannot be maintained so that the film which has been pressed by the external pressure is made not to receive this external pressure. Thereby, in this case, the film becomes loose enough to easily confirm the looseness from its appearance. Also in the case where the welding failure of gas-molecule-level size exists in the film, the looseness of the film is similarly caused after leaving the film for several hours or several days. Thereby, the presence of the welding failure is determined. Moreover in these cases, a size of the pinhole and a diameter of the welding failure can be estimated based on a time duration for causing such looseness (an elapsed time from a time point when the inside became in the vacuum state). This elapsed time is used as an important inspection parameter for determining welding requirements. If such a failure is detected in this inspection, a reprocessing is conducted.

Patent Document 1: Japanese Patent Application Publication No. 2002-313677

SUMMARY OF THE INVENTION

By bringing the inside of the capacitor unit enclosed with the aluminum laminate film to the vacuum state, the detection of the pinhole and/or the welding failure of this film is carried out. If the failure of the film is detected, the reprocessing is conducted. However, there are cases where a large amount of moisture enough to disable the reprocessing enters the inside of the capacitor.

Specifically, if the aluminum laminate film has the pinhole failure and/or the welding failure at the film's portion(s) except near the electrolytic-solution inlet 110; when the inside of the electric double layer capacitor has been depressurized, an outside air existing between the aluminum laminate film 114 and the end plate 109 is prevented from entering the inside of the capacitor only at a corner portion 110a of the electrolytic-solution inlet 110 with which the aluminum laminate film 114 is in contact as shown in FIG. 5. Accordingly, there are cases where a large amount of moisture enough to disable the reprocessing enters the inside of the capacitor.

It is therefore an object of the present invention which is given with the above-mentioned problem into consideration, to provide an electric double layer capacitor devised to suppress the entry of moisture into the depressurized inside of the capacitor even in the case where an enclosing member has a failure portion.

An electric double layer capacitor according to an first invention for solving the above-mentioned problem includes a plurality of cells each including activated-carbon electrodes disposed on both sides of a separator; a plurality of packing members each disposed at an outer periphery of the cell, each of the plurality of cells and the plurality of packing members being stacked through a charge collector; and both end plates sandwiching the plurality of cells and the plurality of packing members through both collector electrodes, at least one of the end plates being formed with an inlet through which an electrolytic solution is injected, wherein the electric double layer capacitor is covered and sealed with an enclosing member; and the electric double layer capacitor includes an O-ring disposed in the inlet, or an edge of the inlet is curved.

An electric double layer capacitor according to a second invention for solving the above-mentioned problem includes a coating member which is disposed between the enclosing member and the end plate and which covers at least the inlet, further in addition to the electric double layer capacitor according to the first invention.

An electric double layer capacitor according to a third invention for solving the above-mentioned problem includes the electric double layer capacitor according to the second invention, wherein the coating member is a polyethylene terephthalate film.

In the electric double layer capacitors according to the present invention, the plurality of cells each including activated-carbon electrodes disposed on both sides of the separator and the plurality of packing members each disposed at the outer periphery of the cell are stacked through the charge collector (s); the both end plates sandwiches the plurality of cells and the plurality of packing members through both collector electrodes; at least one of the end plates is formed with the inlet through which electrolytic solution is injected; the electric double layer capacitor is covered and sealed with the enclosing member; and the O-ring is disposed in the inlet, or the edge of the inlet is curved. Accordingly, the enclosing member becomes in surface-contact with the O-ring or the edge of the inlet, when exposing the capacitor at an atmospheric pressure after depressurizing the inside of the capacitor to vacuum state. Accordingly, even if the enclosing member has a failure at its welding portion located other than in the proximity of the inlet and thereby causes a vacuum leakage, the outside air which has entered between the enclosing member and the end plate can be prevented from promptly entering into the inside of the capacitor as compared with the case of an electric double layer capacitor of earlier technology in which an enclosing member is in point-contact with an edge of inlet of an end plate. Accordingly, the reprocessing can be conducted even after the sealing failure is found from its appearance.

In the electric double layer capacitors according to the present invention, there is provided the coating member which is disposed between the enclosing member and the end plate and which covers at least the inlet. Accordingly, the enclosing member can be prevented from being directly in contact with the edge portion of the inlet of the end plate. When the inside has been depressurized to the vacuum state, the outside air between the enclosing member and the end plate can be prevented more reliably from promptly entering into the inside of the capacitor. Accordingly, even after detecting a sealing failure from its appearance, the reprocessing can be conducted.

In the electric double layer capacitor according to the present invention, the coating member is a polyethylene terephthalate film. Accordingly in addition to the above-mentioned operations and advantages, even if the outside air enters the inside of the enclosing member when the inside of the capacitor has been depressurized to vacuum state; the polyethylene terephthalate film itself is thin and flexible, and therefore there is no possibility that the sealing between the polyethylene terephthalate film and the end plate at a position corresponding to the inlet is removed by the external pressure and the outside air enters the inside of the capacitor. As the result, even after finding a sealing failure of the enclosing member from its appearance, the reprocessing can be carried out.

BEST MODE FOR CARRYING OUT THE INVENTION

Hereinafter, electric double layer capacitors according to a best mode for carrying out the present invention will be concretely explained with reference to some embodiments.

First Embodiment

An electric double layer capacitor according to a first embodiment of the present invention will now be explained by use of the drawings.

Figure 1:
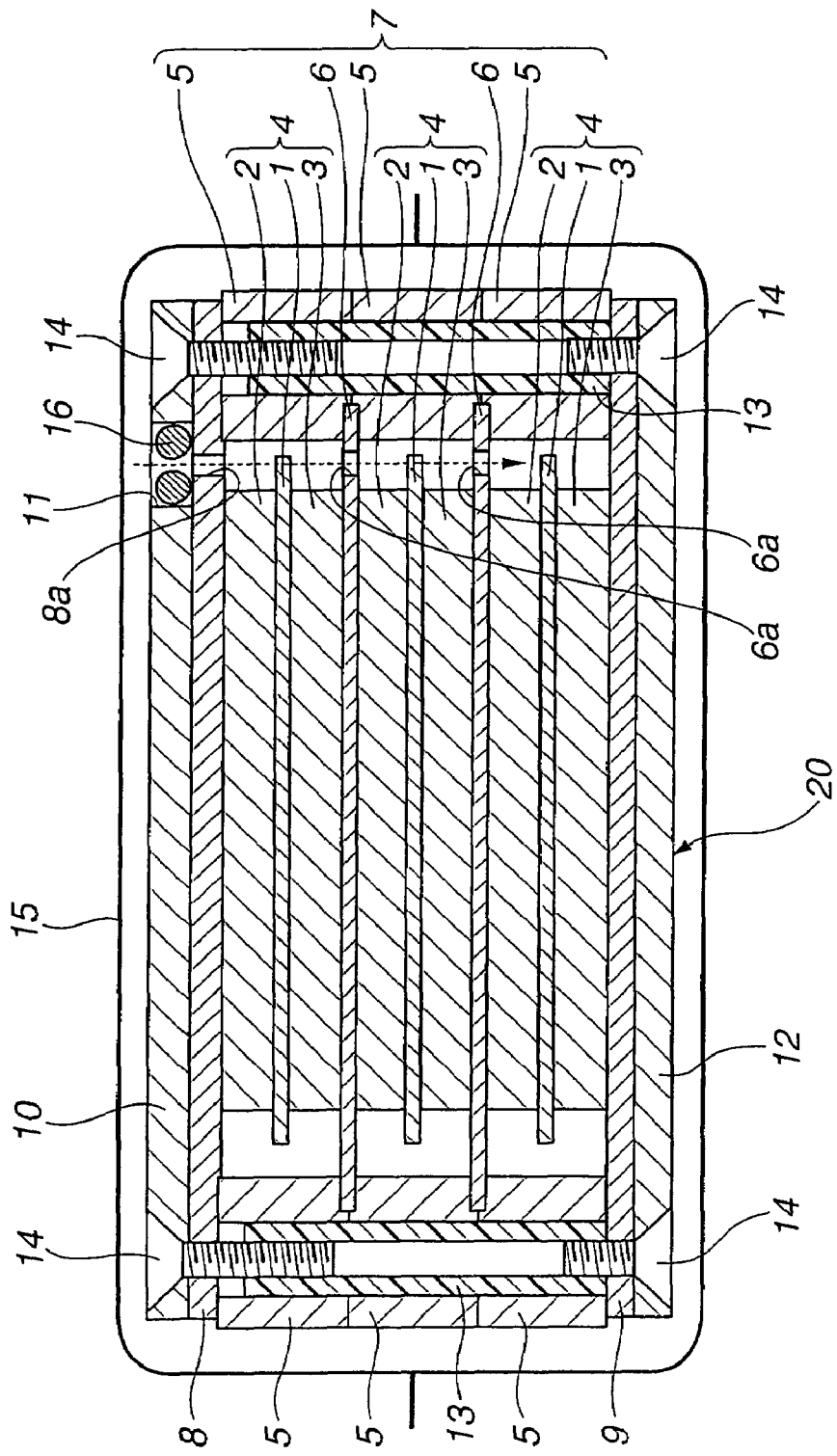
[FIG. 1] A schematic sectional view showing an electric double layer capacitor according to a first embodiment of the present invention.
Figure 2:
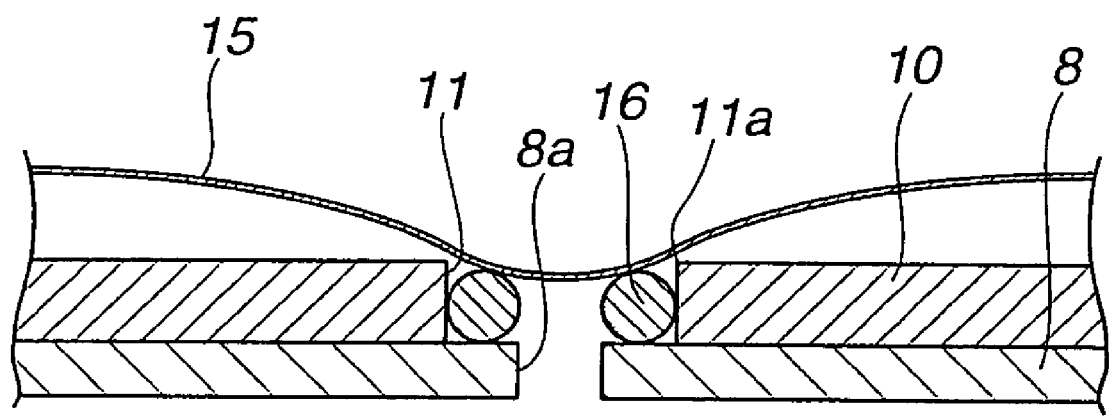
[FIG. 2] An explanatory view showing a condition where an inside of the electric double layer capacitor according to the first embodiment of the present invention has been depressurized.

FIG. 1 is a schematic sectional view showing the electric double layer capacitor according to the first embodiment of the present invention. FIG. 2 is an explanatory view showing a condition where an inside of the electric double layer capacitor according to the first embodiment of the present invention has been depressurized.

The electric double layer capacitor 20 according to the first embodiment of the present invention includes cells 4 as shown in FIG. 1. Each of the cells 4 includes an ion-permeable separator 1 and activated-carbon electrodes 2 and 3 disposed respectively at both sides of the separator 1. At an outer periphery of this cell 4, a packing member (packing) 5 is disposed. A plurality of packing members 5 and cells 4 are layered or stacked (e.g., in three layers in this drawing) through a charge collector(s) 6, to form a module 7. The module 7 including the cells 4, the packing members 5 and the charge collectors 6 each forming a lamination is sandwiched by end plates 10 and 12 through collector electrodes (collector electrode terminals) 8 and 9 on both sides of the module 7. A spacer 13 extending in a stacking direction is inserted into the packing members 5. The spacer 13 is formed of resin. Both sides of the spacer 13 are fixedly connected respectively with the end plates 10 and 12 by bolts 14. Thus, a sealed structure (enclosed structure) of the module 7 is maintained. An aluminum laminate film 15 encloses an entire periphery (all outer-peripheral surface) of the electric double layer capacitor 20 to seal the electric double layer capacitor 20.

One end plate 10 of the end plates 10 and 12 is formed with an inlet (inlet hole) 11. The inlet 11 serves to allow an electrolytic solution to be injected through the inlet 11 to the inside of the electric double layer capacitor 20, and to allow a gas existing within the electric double layer capacitor 20 to be released through the inlet 11 to the external of the electric double layer capacitor 20. In this inlet 11, an O-ring 16 is disposed. This O-ring 16 has a thickness (inner diameter) substantially same in magnitude as a depth of the inlet 11 (a thickness of the end plate 10). Moreover, the O-ring 16 has an outer diameter substantially same in magnitude as a diameter of the inlet 11. A guide hole 8a for guiding the electrolytic solution to the inside of the electric double layer capacitor 20 is formed in a portion of the collector electrode 8 which is located in an extending direction of a central axis of the inlet 11. Moreover, a hole 6a is formed in the charge collector 6. Thus, the electrolytic solution can be spread inside the capacitor 20.

Since the O-ring 16 is provided in the inlet 11; when exposing the electric double layer capacitor 20 at an atmospheric pressure after reducing a pressure of the inside of the electric double layer capacitor 20 to vacuate the inside of capacitor 20, a portion of the aluminum laminate film 15 which is located in proximity to the inlet 11 presses the O-ring 16 under a condition of surface contact between the aluminum laminate film 15 and the O-ring 16 because of external pressure. Thereby, a sealing between the aluminum laminate film 15 and the collector electrodes 8 and 9 is achieved. In this condition, even when a welding portion of the enclosing member causes a vacuum leakage (seal leakage) due to a faulty part of the aluminum laminate film 15, the aluminum laminate film 15 is in surface-contact with the O-ring 16 in the proximity of the inlet 11, as shown in FIG. 2. At this time, outside air enters between the aluminum laminate film 15 and the end plate 10. However, this outside air can be prevented from immediately entering into the inside of capacitor 20, as compared with the case of an electric double layer capacitor of earlier technology in which an aluminum laminate film makes a point contact with an edge of inlet of an end plate. Accordingly, even after finding a sealing failure from the appearance of the aluminum laminate film 15, a reprocessing can be performed.

The above-mentioned O-ring 16 has only to be a material having a resistance to the electrolytic solution and having a degree of rigidity which does not vary the shape of O-ring 16 even during the decompressed (depressurized) state.

Therefore, in the electric double layer capacitor 20 according to the first embodiment of the present invention; since the O-ring 16 is disposed in the inlet 11 formed through the end plate 10, the aluminum laminate film 15 becomes in contact with the O-ring 16 by means of surface contact when the electric double layer capacitor 20 is exposed at an atmospheric pressure under the condition where the inside of the electric double layer capacitor 20 has been depressurized to vacuum state. Accordingly, even if the aluminum laminate film 15 has an improper (failed) portion located other than in the proximity of the inlet 11 and thereby causes the vacuum leakage, the outside air which has entered into a clearance between the aluminum laminate film 15 and the end plate 10 or 12 can be prevented from promptly entering into the inside of the capacitor as compared with the case of an electric double layer capacitor of earlier technology in which an aluminum laminate film is in point-contact with an edge of inlet of an end plate. Accordingly, the reprocessing can be carried out even after a sealing failure is found from its appearance.

Moreover, in the case where the inside of the capacitor is being sealed by the aluminum laminate film 15 under vacuum state, it can be easily judged whether a slight amount of air-tight leakage is caused or not from the outside. Thereby, it can be determined whether a water (moisture) blocking has been reliably achieved or not. As a result, a high-quality capacitor having no influence of the moisture entry can be easily manufactured.

In the above explanation about the first embodiment, in the inlet 11, the electric double layer capacitor 20 is equipped with the O-ring 16 having a thickness substantially same in magnitude as the depth of the inlet 11 (the thickness of the end plate 10) and having the outer diameter substantially same in magnitude as the diameter of the inlet 11. However, a corner portion 11a corresponding to the edge of this inlet 11 may be formed in a shape curved (and extended) toward a center side of the inlet 11. In this case, it is preferable that the curved shape of the corner portion 11a is similar in cross section as a circular shape of the O-ring 16 shown in FIG. 2. However in this case, the curved shape of the corner portion 11a has only to be designed to make a surface-contact with the aluminum laminate film 15, as shown in FIG. 2. Such an electric double layer capacitor also produces the similar operations and effects as those of the above-mentioned electric double layer capacitor 20 according to the first embodiment of the present invention, and moreover produces an advantage that an increase in manufacturing cost can be suppressed because of the nonnecessity of O-ring.

Second Embodiment

An electric double layer capacitor according to a second embodiment of the present invention will now be explained concretely by use of the drawings.

Figure 3:
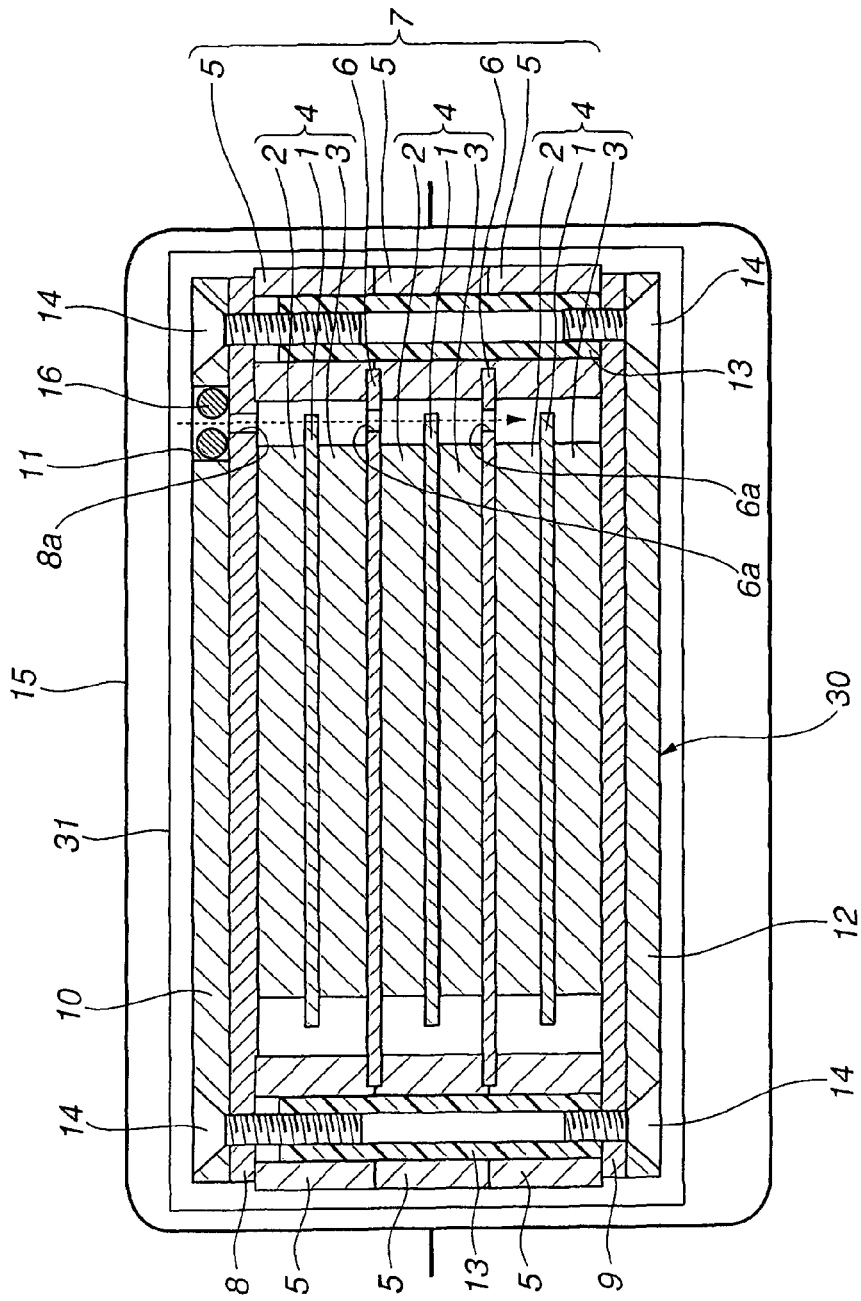
[FIG. 3] A schematic sectional view showing an electric double layer capacitor according to a second embodiment of the present invention.
Figure 4:
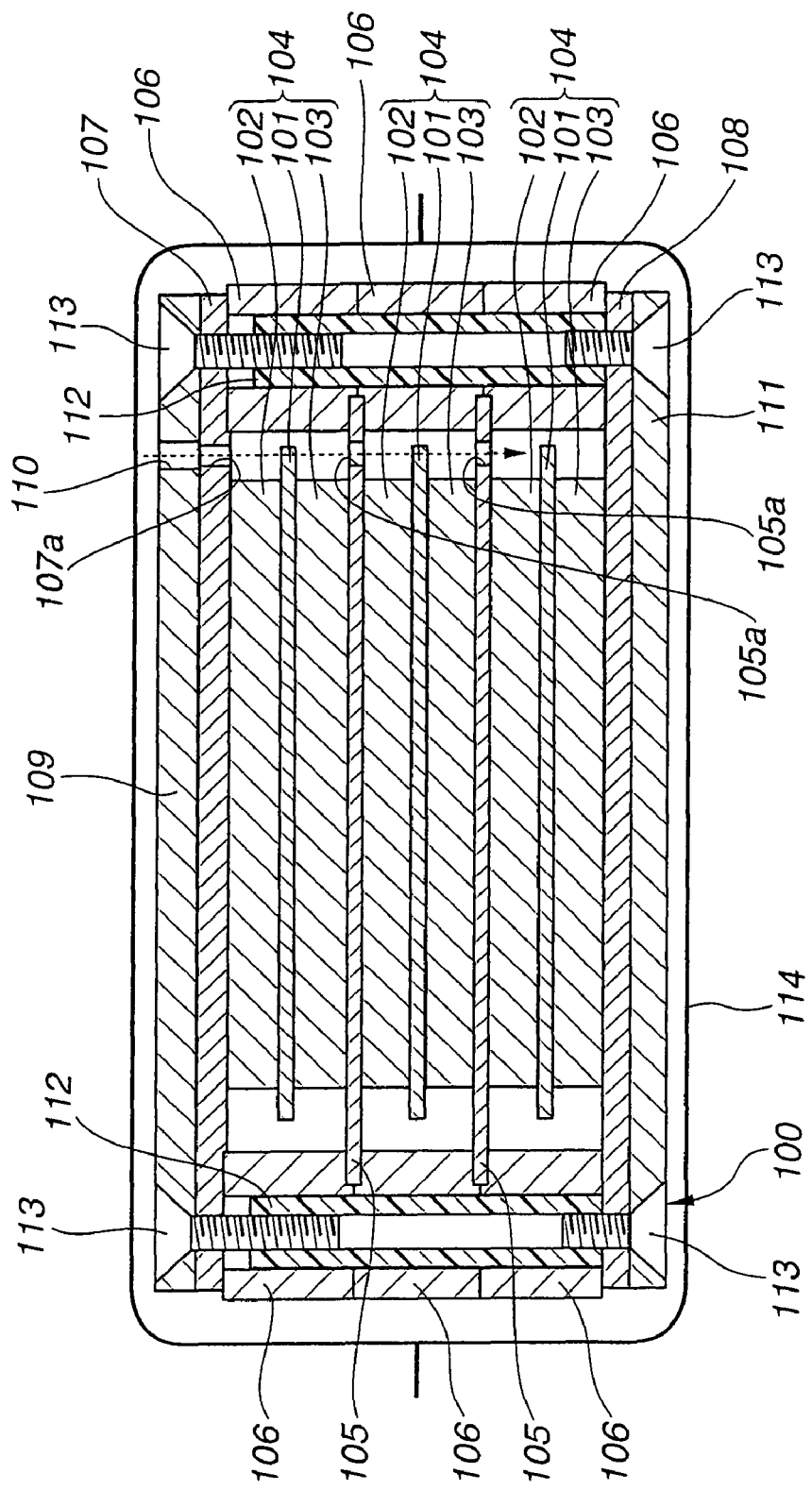
[FIG. 4] A schematic sectional view showing a conventional electric double layer capacitor.
Figure 5:
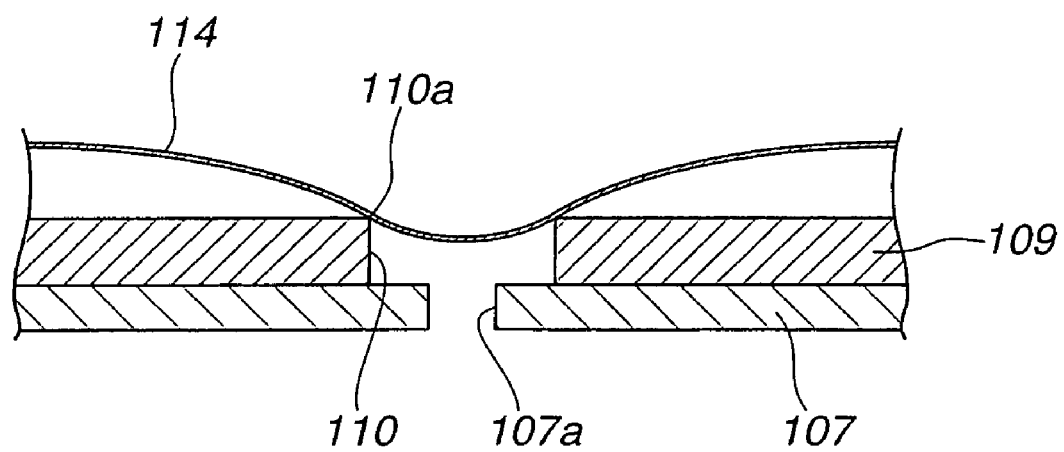
[FIG. 5] An explanatory view showing a condition where an inside of the conventional electric double layer capacitor has been depressurized.

FIG. 3 is a schematic sectional view showing the electric double layer capacitor according to the second embodiment of the present invention. The electric double layer capacitor according to the second embodiment of the present invention includes the same members as those of the above-mentioned electric double layer capacitor according to the first embodiment of the present invention, and further includes a coating member (covering member) disposed between the end plate and the aluminum laminate film. Hence, the same members as those of the above-mentioned electric double layer capacitor according to the first embodiment of the present invention are given same reference signs, and the explanations thereof will be omitted.

The electric double layer capacitor 30 according to the second embodiment of the present invention is equipped with the coating member 31 placed between the end plate 10 and the aluminum laminate film 15, as shown in FIG. 3. This coating member 31 covers or coats whole of the electric double layer capacitor 30 to seal the electric double layer capacitor 30.

A polyethylene terephthalate film (hereinafter referred to as "PET film") can be cited as the above-mentioned coating member 31. By using such a PET film which is obtainable at a low price, the increase in manufacturing cost can be suppressed. The thickness of this PET film has only to be greater than or equal to 18 micrometer and smaller than or equal to 50 micrometer, i.e., has only to range between 18 micron and 50 micron. If the PET film has a thickness smaller than 18 micrometer, a flexibility and a resistance of the PET film itself are low so that the PET film is susceptible to damage and breaking. On the other hand, if the PET film has a thickness greater than 50 micrometer, the flexibility of the PET film itself is low, so that the PET film is low in handling characteristic and therefore is unsuitable for the usage as the coating member. The PET film is thin and flexible as compared with the aluminum laminate film 15. Accordingly, even in the case where the aluminum laminate film 15's portion located at any except near the inlet 11 causes the vacuum leakage and thereby the outside air enters inside the aluminum laminate film 15 when the inside of the capacitor has been depressurized to vacuum state; there is no possibility that the sealing between the PET film 31 and the end plate 10 at a position corresponding to the inlet 11 of the end plate 10 is removed by the external pressure and the outside air enters the inside of the capacitor. In this case, there is only an influence of a slight amount of moisture penetrating through the resin layer. As a result, even after finding a sealing failure of the aluminum laminate film 15 from its appearance, the reprocessing can be conducted. Under the condition where the thickness of the PET film is equal to 25 micrometer, the inventor of present application has confirmed that there is no influence of this reprocessing for about one month.

Therefore, in the electric double layer capacitor 30 according to the second embodiment of the present invention; the similar operations and effects as those of the above-mentioned electric double layer capacitor 20 according to the first embodiment of the present invention are produced. Additionally, since the coating member 31 is provided or interposed between the aluminum laminate film 15 and the capacitor 30, the aluminum laminate film 15 can be prevented from being directly in contact with the corner portion 11a of the inlet 11 of the end plate 10. When the inside of the capacitor has been depressurized to the vacuum state, the outside air made to enter between the aluminum laminate film 15 and the end plate 10 can be prevented more reliably from promptly entering the inside of the capacitor. Accordingly, even after detecting a sealing failure from its appearance, the reprocessing can be conducted.

In the above-described explanations, the coating member 31 encloses the whole of electric double layer capacitor 30. However, the electric double layer capacitor 30 may be equipped with a coating member which is formed in greater area size than that of the inlet 11, which is disposed between the end plate 10 and the aluminum laminate film 15, and which covers this inlet 11. Such an electric double layer capacitor also produces the similar operations and effects as those of the above-described electric double layer capacitor 30 according to the second embodiment of the present invention, and moreover produces an advantage that an increase in manufacturing cost can be suppressed because such coating member itself is necessary in a relatively small amount.

The present invention is applicable to an electric double layer capacitor, and particularly to an electric double layer capacitor sealed with an enclosing member.

The invention claimed is:

1. An electric double layer capacitor, comprising:
    a plurality of cells each including activated-carbon electrodes disposed on both sides of a separator;
    a plurality of packing members each disposed at an outer periphery of the cell, each of the plurality of cells and the plurality of packing members being stacked through a charge collector; and
    both end plates sandwiching the plurality of cells and the plurality of packing members through both collector electrodes, at least one of the end plates being formed with an inlet through which an electrolytic solution is injected, wherein
    the electric double layer capacitor is covered and sealed with an enclosing member; and
    the electric double layer capacitor comprises an O-ring disposed in the inlet, or an edge of the inlet is curved.

2. The electric double layer capacitor as claimed in claim 1, further comprises
    a coating member disposed between the enclosing member and the end plate, and covering at least the inlet.

3. The electric double layer capacitor as claimed in claim 2, wherein
    the coating member is a polyethylene terephthalate film.

* * * * *